US007062711B2

(12) United States Patent
Kethireddy

(10) Patent No.: US 7,062,711 B2
(45) Date of Patent: Jun. 13, 2006

(54) USER INTERFACE AND METHOD FOR PROVIDING SEARCH QUERY SYNTAX HELP

(75) Inventor: Amarender Kethireddy, Fountain Valley, CA (US)

(73) Assignee: Sharp Laboratories of America, inc., Camas, WA (US)

( * ) Notice: Subject to any disclaimer, the term of this patent is extended or adjusted under 35 U.S.C. 154(b) by 429 days.

(21) Appl. No.: 10/066,088

(22) Filed: Jan. 30, 2002

(65) Prior Publication Data

US 2003/0202002 A1   Oct. 30, 2003

(51) Int. Cl.
*G06F 3/14* (2006.01)
*G06F 17/30* (2006.01)

(52) U.S. Cl. ............... 715/705; 715/968; 715/709; 715/808; 715/780; 707/4; 707/5

(58) Field of Classification Search .................. 707/3, 707/4, 5; 345/768, 706, 715; 715/968, 705, 715/708, 709, 710, 711, 780, 808, 809
See application file for complete search history.

(56) References Cited

U.S. PATENT DOCUMENTS

| | | | | |
|---|---|---|---|---|
| 5,550,967 A | * | 8/1996 | Brewer et al. | 345/709 |
| 5,877,757 A | * | 3/1999 | Baldwin et al. | 345/705 |
| 6,285,998 B1 | * | 9/2001 | Black et al. | 707/4 |
| 6,345,273 B1 | * | 2/2002 | Cochran | 707/4 |
| 6,453,312 B1 | * | 9/2002 | Goiffon et al. | 707/3 |
| 6,587,122 B1 | * | 7/2003 | King | 715/708 |
| 6,691,159 B1 | * | 2/2004 | Grewal et al. | 709/219 |
| 6,728,700 B1 | * | 4/2004 | Richards et al. | 707/3 |
| 6,732,090 B1 | * | 5/2004 | Shanahan et al. | 707/3 |
| 6,925,608 B1 | * | 8/2005 | Neale et al. | 715/763 |
| 2001/0052030 A1 | | 12/2001 | Shiraishi | 709/310 |
| 2002/0078020 A1 | * | 6/2002 | Lawton | 707/1 |

FOREIGN PATENT DOCUMENTS

JP          2001175596          6/2001

* cited by examiner

*Primary Examiner*—Raymond J. Bayerl
(74) *Attorney, Agent, or Firm*—David C. Ripma

(57) ABSTRACT

A search engine user interface and method are presented for providing search syntax help. The method comprises: presenting a search engine user interface with a selectable edit box for formulating a search request; formulating a search engine search request by selecting the UI edit box; and, in response to the search request, automatically supplying search syntax help in the form of a popup window. Automatically supplying search syntax help includes displaying search syntax characters supported by the search engine, where the search syntax characters are selected from the group including connectors and operators. Further, the help can be the displaying of search syntax character definitions, frequently-used search syntax characters, a list of every supported search syntax character, or examples in which the search syntax characters are used. The method further comprises: following the formulating of a search engine search request, submitting the search request to the search engine; in response to submitting the search request, automatically closing the search syntax help popup window; and, displaying the results of the search. In some aspects, the method comprises: editing the search engine search request; and, in response to the editing the search request, automatically supplying search syntax help.

24 Claims, 5 Drawing Sheets

USER INTERFACE AND METHOD FOR PROVIDING SEARCH QUERY SYNTAX HELP

BACKGROUND OF THE INVENTION

1. Field of the Invention

This invention generally relates to a search engine user interface and, more particularly, to a user interface and a method for automatically providing search syntax help when formulating a search inquiry.

2. Description of the Related Art

Many software applications permit a user to search a document or a web site for the occurrence of a particular word or phrase. Those applications use a search engine(s) with engine specific capabilities. The search engine requires that the search request or inquiry be made in the context of specific search request syntax. Search engines have their own user interface (UI) for the user to enter text, and search for the occurrences of that text. A typical search engine UI consists of, at the minimum, an edit box in which user enters text, or a search term to be searched, and a "Search" (or "GO" button or "Find" button) button, which when clicked, reads the search request in the edit box. The search request is then activated or submitted to the search engine. After searching for the occurrence of the search term, the search results are displayed.

Every search engine has its own syntax for submitting the search request. In most cases, the search request syntax is not obvious and users typically have to refer to search engine documentation or help topics for the correct search request syntax supported by that particular search engine. For example, some search engines support syntax operators, keywords, or characters such as "+", "−", "and", "or", "near", "before" etc. for submitting a search request term. Conventionally, there is no automatic help for these syntax rules in the submission of a "correct" search request.

This lack of automatic search syntax help may be irrelevant for simple searches, but even a simple search may return too large a list of search results. Thus, even when performing a simple search, a user may seek to narrow down, or limit the search results. By using the advanced syntax characters, which are defined herein as the operators and/or connectors supported by the search engine, in the search request, more powerful search queries can be framed. Further, the search result set can be made more narrow and closer to the scope envisioned by the user.

However, the syntax supported by the search engine is not always obvious. In many cases, syntax uncertainty is the main constraint faced by the users in the submission of powerful search requests. Typically, syntax help is provided in a help topics menu. The user either has to refer to a search engine manual or activate the online help by selecting a "help" menu. Once the help menu is found, it is not necessarily handy or accessible as the user actually formulates a search request.

It would be advantageous if a user could more easily frame a powerful search request for a search engine.

It would be advantageous if the user has better access to syntax help information while formulating their search requests.

It would be advantageous if a search syntax help popup window could be displayed to the user while they were formulating a search request. Further, it would be advantageous if the syntax help included search syntax characters and examples of how the search syntax characters are used.

SUMMARY OF THE INVENTION

The present invention enables the user to determine the correct syntax for the search request without performing additional actions or steps, such as clicking a help button or accessing a syntax help topic. This automatically-supplied help promotes the efficient use of resources by aiding in the submission of correct search request (so that search results are more meaningful), and encouraging the user to use more advanced search request to narrow down the search results.

The present invention has several advantages over more conventional user interfaces, as follow:

1. The user does not have to make an extra effort to discover the exact search request syntax supported by the search engine or application. The user does not need to refer to search engine or software application manuals for the search request syntax.

2. The user has a good idea of all the search syntax characters (operators or connectors) supported, and more meaningful search requests can be made using those characters.

3. The present invention search syntax help method promotes the drafting of more powerful and advanced search requests that are closer to what the user actually expects.

4. The present invention search syntax help method minimizes the errors generated by the incorrect use of syntax in search requests.

5. The present invention search syntax help method minimizes the generation of spurious search results.

Accordingly, a method is presented for providing search syntax help in a search engine user interface. The method comprises: presenting a search engine user interface with a selectable edit box for formulating a search request; formulating a search engine search request by selecting the UI edit box; and, in response to the search request, automatically supplying search syntax help in the form of a popup window.

Automatically supplying search syntax help includes displaying search syntax characters supported by the search engine, where the search syntax characters are selected from the group including connectors and operators. Further, the help can be the displaying of search syntax character definitions, frequently-used search syntax characters, a list of every supported search syntax character, or examples in which the search syntax characters are used.

The method further comprises: following the formulating of a search engine search request, submitting the search request to the search engine; in response to submitting the search request, automatically closing the search syntax help popup window; and, displaying the results of the search. In some aspects, the method comprises: editing the search engine search request; and, in response to the editing the search request, automatically supplying search syntax help.

Additional details of the above-described method, and a search engine user interface with search inquiry syntax help are described below.

DETAILED DESCRIPTION OF THE PREFERRED EMBODIMENTS

Figure 1:
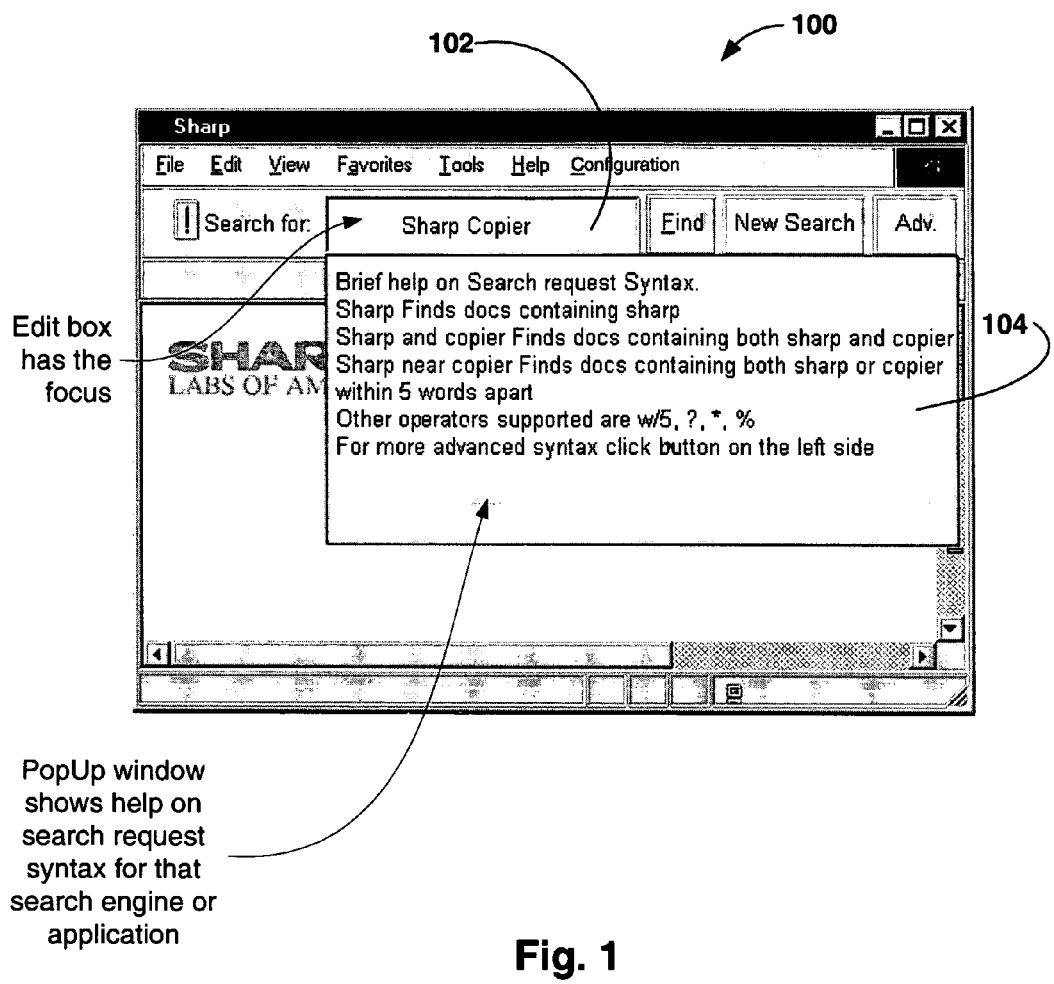
FIG. 1 is a depiction of the present invention search engine user interface (UI) with search inquiry syntax help.

FIG. 1 is a depiction of the present invention search engine user interface (UI) with search inquiry syntax help. The user interface 100 comprises a selectable focus edit box 102 for inputting a search request to a search engine and a search syntax help popup window 104 that automatically appears in response to selecting the edit box 102. The popup window 104 appears in response to just selecting the edit box 102. As content is added to the edit box 102, more specific help is provided in the popup window 104. That is, the popup window help is responsive to the search terms and search syntax characters that are entered into the edit box 102. Although the popup window 104 is depicted immediately below the edit box 102 in FIG. 1, the present invention UI 100 is not limited to any particular layout or positional relationship between the edit box 102 and the popup window 104.

The search syntax help popup window 104 displays search syntax characters that are supported by the search engine. Although an exemplary description of the present invention UI 100 is given in the context of a search engine, it should be understood to be applicable to any software application or word processing system that provides a word search capability. The search syntax characters are understood to be connectors and operators. Shown in FIG. 1 are search syntax characters "and", "or", "w/5", "?", "*", and "%". However, it should be understood that the present invention UI 100 is not limited to any particular group of search syntax characters. The present invention UI 100 can be used in conjunction with conventional or custom search syntax characters.

Figure 2:
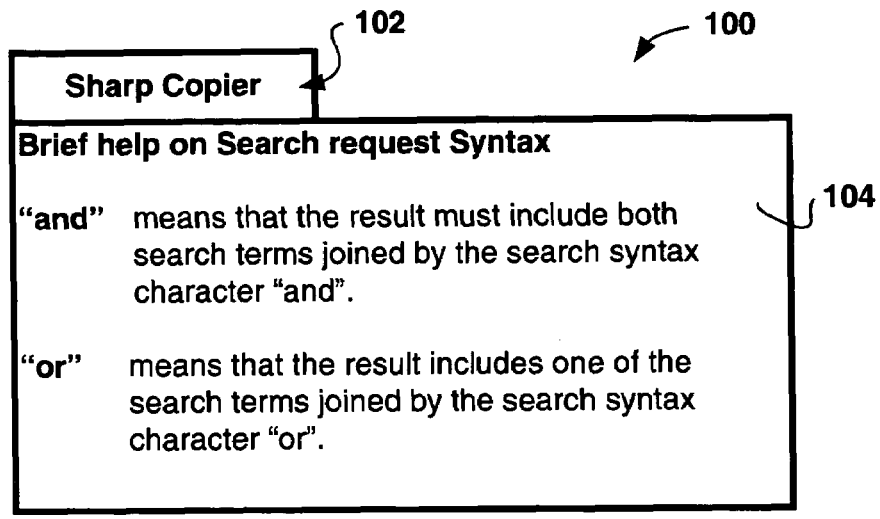
FIG. 2 is a depiction of the present invention UI, where the search syntax help popup window displays search syntax character definitions.

FIG. 2 is a depiction of the present invention UI 100, where the search syntax help popup window 104 displays search syntax character definitions. As shown, the popup window gives the definition for the search syntax characters "and" and "or". Alternately, as shown in FIG. 1, the definitions are given in the context of search terms.

In some aspects, the present invention UI search syntax help popup window 104 displays a list of frequently-used search syntax characters. Alternately, the search syntax help popup window 104 displays a list of every supported search syntax character. In another aspect, the search syntax help popup window 104 displays examples in which the search syntax characters are used. As shown in FIG. 1, examples are given of how the search syntax characters "and", "or", and "near" are used with the search terms "Sharp" and "copier". Note that examples may be given in combination with a list of frequently-used characters, or with a complete list of search syntax characters.

Figure 3:
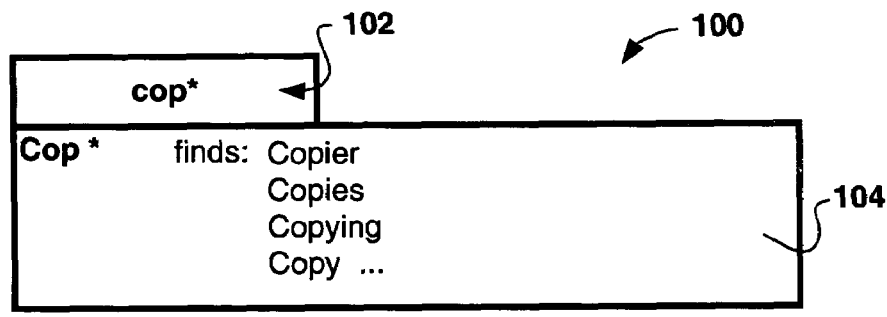
FIG. 3 illustrates another depiction of a search syntax character being used in an example.

FIG. 3 illustrates another depiction of a search syntax character being used in an example. Generally, the edit box 102 accepts a first search syntax character and at least one search term input, and the syntax help popup window 104 displays an example in which the first search syntax character modifies the search term. As shown, the search term "cop" appears in the edit box 104 with the search syntax character "*". In the popup window 104 are examples of how the search term "*" modifies the search term "cop".

Figure 4:
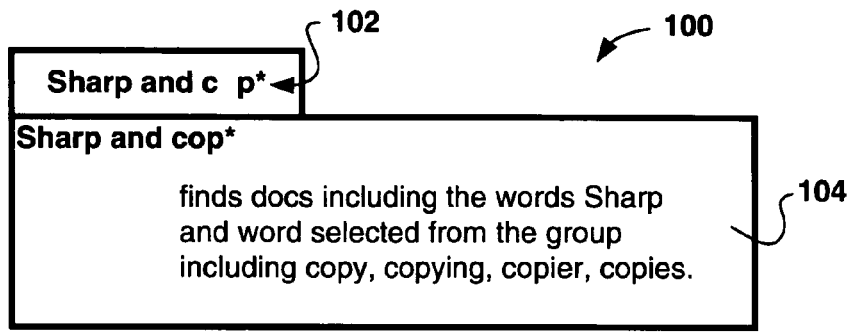
FIG. 4 illustrates the depiction of a plurality of search syntax characters being used in an example.

FIG. 4 illustrates the depiction of a plurality of search syntax characters being used in an example. Then, the edit box 102 accepts a plurality of search syntax character inputs. The syntax help popup window 104 displays an example in which the plurality of search syntax characters modify search terms. As shown, the edit box 102 includes two search terms and two search syntax characters. The term modify, as used herein, is understood to include the operations defined by the search syntax character, when performed on the search terms.

Figure 5:
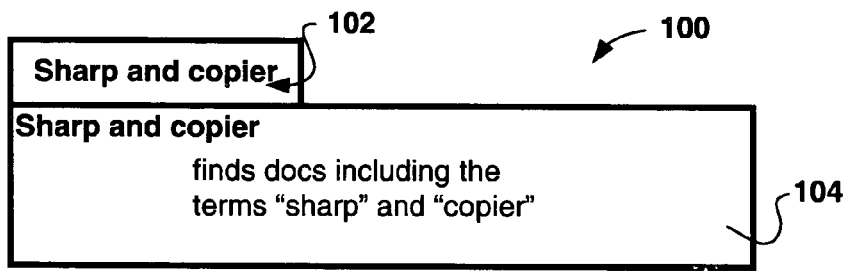
FIG. 5 is a depiction of a search request with a plurality of search terms.

FIG. 5 is a depiction of a search request with a plurality of search terms. In many instances, the edit box 102 accepts a first and second search term input. As shown, the first term is "Sharp", the second term is "copier", and the search syntax character is "and". Then, the syntax help popup window 104 displays an example in which the first search term is linked to the second search term using the first search syntax character. As shown, the example is specific to the search terms and search syntax characters actually input into the edit box 102.

Figure 6:
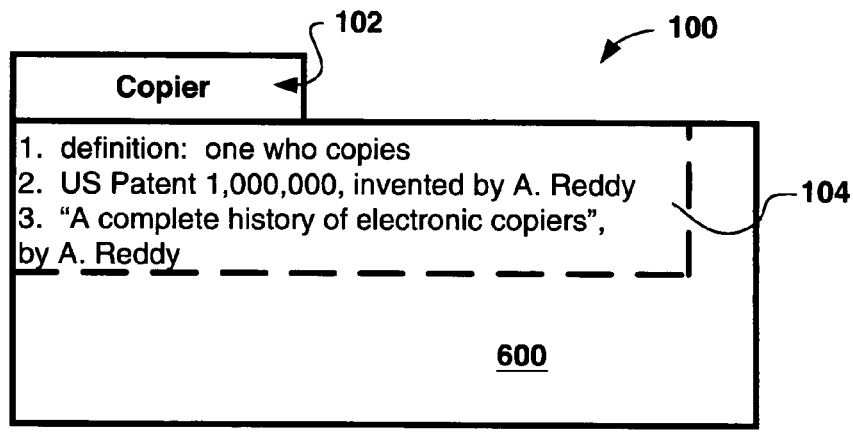
FIG. 6 is a depiction of the present invention UI illustrating the results of a submitted search.

FIG. 6 is a depiction of the present invention UI 100 illustrating the results of a submitted search. The UI 100 further comprises a window 600 to display the results of the submitted search engine search request. The search syntax help popup window (depicted with dotted lines) closes in response the search engine search request being submitted, as the user is no longer formulating the search request. Shown is a list of documents that were found by the search engine in response to submitting the search request "copier".

However, the search syntax help popup window 104 can again be supplied to further the search process. For example, the list of documents that are returned in response to the search term "copier" may be too numerous to realistically evaluate, and the user may choose to narrow the search. Then, the edit box 102 is selected for editing, following the display of the search results in window 600. In response to the selecting the edit box 102, search syntax help is automatically supplied. For example, the user adds the search term "Sharp" and the search syntax character "and", see FIG. 5. In response to reselecting the edit box 102, the popup window 104 reappears.

There are other circumstances in which the popup window 104 closes. As seen in FIG. 1, the user interface 100 typically includes at least a second selectable user interface focus. Shown are toolbar menus identified as "File", "Edit", "View", "Tools", "Internet", and "Help". As is well-known, the selection of one of these menus from the toolbar typically opens additional embedded menus (not shown). Any of these menus or embedded menus can be selected as the focus of the UI 100. When one of these other menus is selected by the user, for example "File", the search syntax help popup window 104 closes in response this alternate user interface focus being selected. Again, the reason for closing the window 104 is the assumption that the user is no longer interested in formulating a search request.

Figure 7:
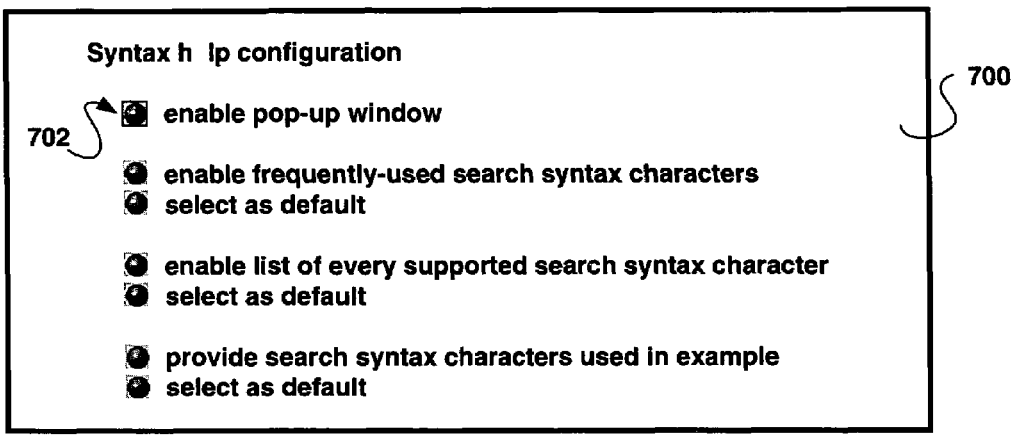
FIG. 7 is a depiction of the present invention UI syntax help configuration menu.

FIG. 7 is a depiction of the present invention UI syntax help configuration menu 700. The syntax help configuration menu 700 can be accessed, for example, directly from the toolbar (see FIG. 1). Alternately, the configuration menu is a sub-heading under the "Help" or "Tools" menus, for example. As shown, the configuration menu 700 includes a user selectable check box 702 to enable the syntax help popup window. The search syntax help popup window appears in response to the configuration check box 702 being selected. That is, the popup window is enabled to appear when the edit box is selected. A user who is familiar with the search engine and the search engine syntax may not desire the popup window to appear. In that case the user would not enable the popup window.

The configuration menu 700 can also be used to enable configuration options. The display frequently-used search syntax characters, a list of every supported character, and/or examples using the search syntax characters, are but a few examples of ways in which the popup window configuration can be modified or customized. Further, the configuration menu 700 can be designed so that these options are the default selections.

FUNCTION DESCRIPTION

The present invention UI enables a method for displaying the supported search request syntax, for any search engine, in any application. A typical use of the UI is as follows:

The user opens the search engine UI (or an application's search feature UI) to find the occurrences of a specific word or a phrase. The user sets the focus (either clicking the mouse or by pressing the "tab" key) to the edit box element of the engine UI.

When the edit box (for entering search text) has the focus, a popup window appears and displays, for example, the most frequently used search syntax supported by the search engine and also brief list of all other operators (or connectors) supported by the search engine. This gives the user an idea of the search syntax characters supported by the search engine and how to use them.

Figure 8:
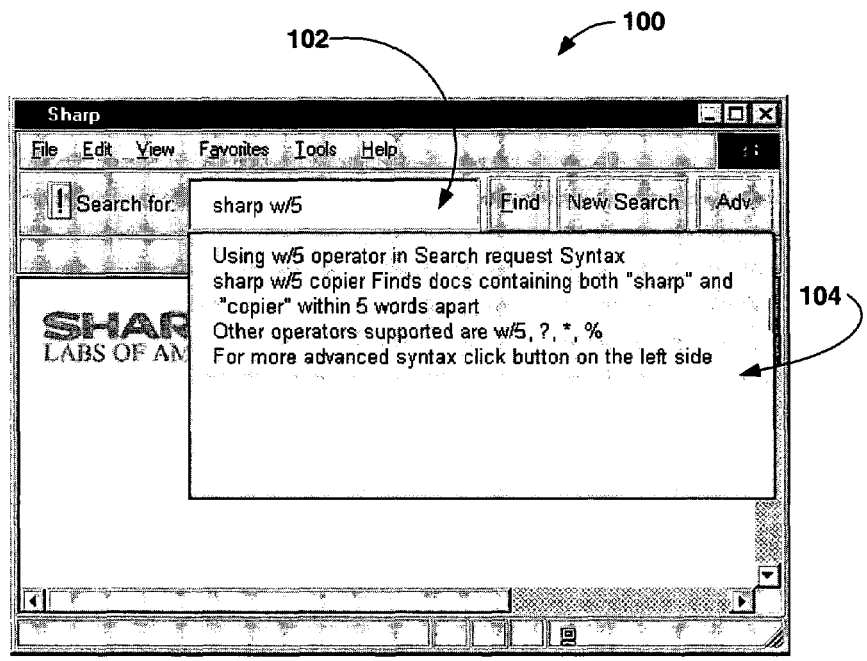
FIG. 8 is another example of the present invention UI popup window providing search syntax help.

FIG. 8 is another example of the present invention UI popup window providing search syntax help. As the user enters particular search terms and search syntax characters in the edit box, the popup window modifies itself to shows the exact syntax and an example using that specific character. When the user tries to use a supported operator or connector, the popup modifies itself to show the specific selected operator syntax with an example. For example, if the user wants to use "w/5" supported operator and drafts a search query like "sharp w/5 copier", then a popup window 104 can be as shown in FIG. 8.

The user, after entering the correct search request, clicks the "search" button and the search results are displayed. The popup window automatically disappears once the focus has gone from the edit box.

For advanced users who have mastered most of the search request syntax, the display of the popup window can be configured by providing a check box in a "preferences", "settings", or configuration menu of the application. Initially, the popup window can be configured, as a default condition, to display the most frequently used search syntax or a list all operators (or connectors) supported by the application or search engine. However, after some experience the user may wish to change the default settings or the popup window display options.

Figure 9:
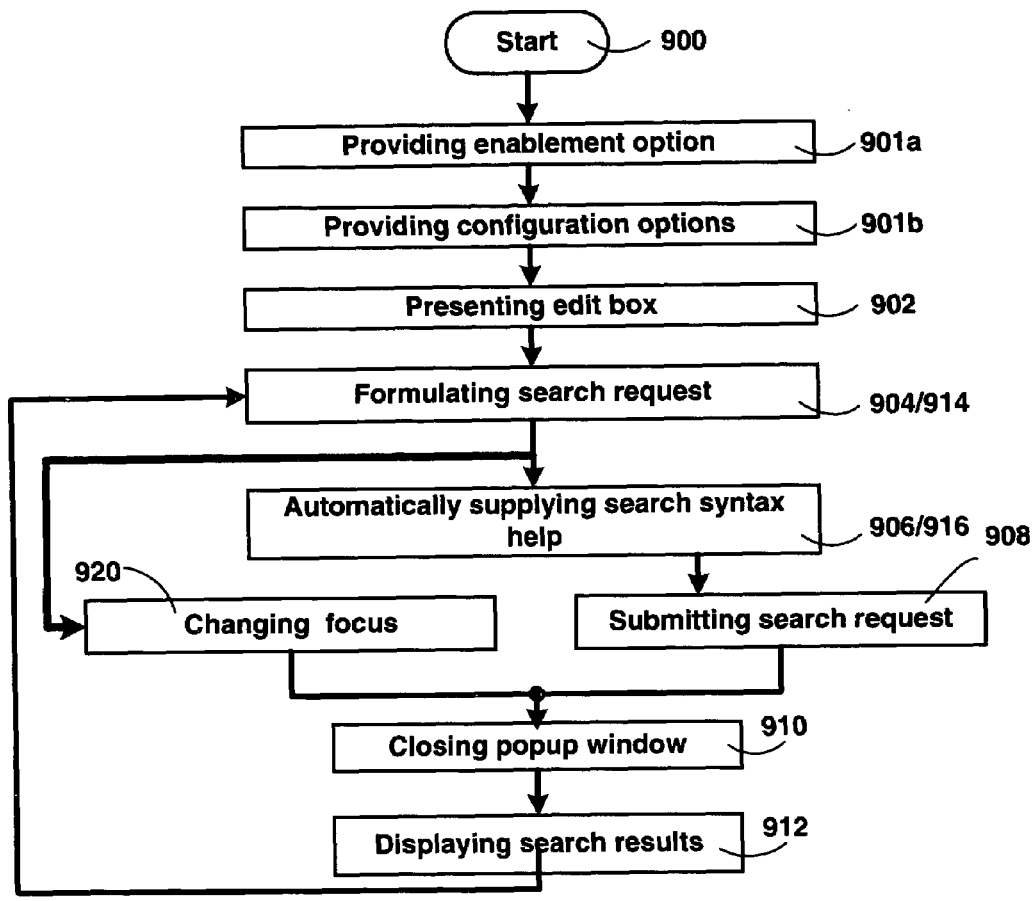
FIG. 9 is a flowchart illustrating the present invention method for providing search inquiry syntax help in a search engine user interface.

FIG. 9 is a flowchart illustrating the present invention method for providing search inquiry syntax help in a search engine user interface. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 900. Step 902 presents a search engine user interface with a selectable user interface edit box for formulating a search request. Step 904 formulates a search engine search request. Formulating a search engine search request includes selecting the edit box. Step 906, in response to the search request, automatically supplies search syntax help. Automatically supplying search syntax help includes displaying a popup window with search syntax help in response to the search request formulated in the edit box. The search syntax help provided in Step 906 becomes more specific to the actual search request as search terms and search syntax characters are added to the edit box.

Automatically supplying search syntax help in Step 906 further includes displaying search syntax characters supported by the search engine, where the search syntax characters are selected from the group including connectors and operators. In some aspects of the method, automatically supplying search syntax help includes displaying search syntax character definitions. In other aspects, a list of frequently-used search syntax characters are displayed. In yet another aspect, a list of every supported search syntax character is displayed.

In some aspects of the method, automatically supplying search syntax help in Step 906 includes displaying examples in which the search syntax characters are used. For example, when Step 904 includes forming a search request with at least one search term and a first search syntax character, Step 906 supplies at least one example in which the first search syntax character modifies the search term. In another example, when Step 904 forms a search request with a plurality of search syntax characters, Step 906 supplies an example in which the plurality of search syntax characters modify (as defined above) search terms. When Step 904 forms a search request with a first and second search term, Step 906 supplies an example in which the first search term is linked to the second search term using the first search syntax character.

Step 908, following the formulating of a search engine search request in Step 904, submits the search request to the search engine. Step 910, in response to submitting the search request, automatically closes the search syntax help popup window. Step 912 displays the results of the search. In some aspects, Step 914 edits the search engine search request. Then Step 916, in response to the editing the search request, automatically supplies search syntax help.

Alternately, following the formulating of a search engine search request in Step 904, Step 920 changes the focus of the search engine user interface. Then Step 910, in response to changing the search engine user interface focus, automatically closes the search syntax help popup window.

In some aspects of the method, Step 901*a* provides a user selectable syntax help enablement option. Then, automatically supplying search syntax help in Step 906 includes supplying search syntax help in response enabling the syntax help option in Step 901*a*. In other aspects, Step 901*b* provides user selectable search syntax help configuration options. Then, automatically supplying search syntax help in Step 906 includes supplying search syntax help configured in response to the search syntax help configuration options. For example, providing user selectable search syntax help configuration options in Step 901*b* can include providing a popup window with frequently-used search syntax characters as a default configuration. Alternately, Step 901*b* can include providing a popup window with a list of every supported search syntax character, or search syntax characters used in examples as a default option.

A user interface and method of providing search syntax help has been presented. A few examples have been given using conventional search terms, connectors, and operators. It should be understood however, that the present invention is not limited to a list of particular terms. Neither is the invention limited to any particular type of search engine or search inquiry. Other embodiments and variations of the invention will occur to those skilled in the art.

The invention claimed is:

1. In a search engine user interface (UI), a method for providing search inquiry syntax help, the method comprising:
presenting a search engine user interface with a selectable user interface edit box for formulating a search request;
selecting the search request edit box; and,
in response to selecting the search request edit box, automatically supplying search syntax help including a popup window display of search syntax characters supported by the search engine.

2. The method of claim 1 wherein displaying search syntax characters supported by the search engine includes displaying search syntax characters selected from the group including connectors and operators.

3. The method of claim 2 wherein automatically supplying search syntax help includes displaying search syntax character definitions.

4. The method of claim 2 wherein automatically supplying search syntax help includes supplying a list of frequently-used search syntax characters.

5. The method of claim 2 wherein automatically supplying search syntax help includes displaying a list of every supported search syntax character.

6. The method of claim 2 wherein automatically supplying search syntax help includes displaying examples in which the search syntax characters are used.

7. The method of claim 6 further comprising:
subsequent to selecting the search request edit box, formulating a search engine search request with at least one search term and a first search syntax character; and,
wherein supplying examples in which the search syntax characters are used includes supplying an example in which the first search syntax character modifies the search term.

8. The method of claim 7 further comprising:
subsequent to selecting the search request edit box, formulating a search engine search request with a first and second search term; and,
wherein supplying examples in which the search syntax characters are used includes supplying an example in which the first search term is linked to the second search term using the first search syntax character.

9. The method of claim 6 further comprising:
subsequent to selecting the search request edit box, formulating a search engine search request with a plurality of search syntax characters; and,
wherein supplying examples in which the search syntax characters are used includes supplying an example in which the plurality of search syntax characters modify search terms.

10. The method of claim 2 further comprising:
following the formulating of a search engine search request, submitting the search request to the search engine; and,
in response to submitting the search request, automatically closing the search syntax help popup window.

11. The method of claim 10 further comprising:
displaying the results of the search;
editing the search engine search request; and,
in response to the editing the search request, automatically supplying search syntax help.

12. The method of claim 2 further comprising:
following the formulating of a search engine search request, changing the focus of the search engine user interface; and,
in response to changing the search engine user interface focus, automatically closing the search syntax help popup window.

13. The method of claim 2 further comprising:
providing user selectable search syntax help configuration options; and,
wherein automatically supplying search syntax help includes supplying search syntax help configured in response to the search syntax help configuration options.

14. The method of claim 13 wherein providing user selectable search syntax help configuration options includes providing a popup window with frequently-used search syntax characters as a default configuration.

15. The method of claim 13 wherein providing user selectable search syntax help configuration options includes providing a popup window with a list of every supported search syntax character as a default configuration.

16. The method of claim 1 further comprising:
providing a user selectable syntax help enablement option; and,
wherein automatically supplying search syntax help includes supplying search syntax help in response enabling the syntax help option.

17. A search engine user interface (UI) with search inquiry syntax help, the user interface comprising:
a selectable focus edit box for inputting a search request to a search engine; and,
a search syntax help popup window that automatically appears in response to selecting the edit box,
wherein the search syntax help popup window displays search syntax characters supported by the search engine, where the search syntax characters are selected from the group including connectors and operators.

18. The user interface of claim 17 wherein the search syntax help popup window displays search syntax character definitions.

19. The user interface of claim 17 wherein the search syntax help popup window displays a list of frequently-used search syntax characters.

20. The user interface of claim 17 wherein the search syntax help popup window displays a list of every supported search syntax character.

21. The user interface of claim 17 wherein the search-syntax help popup window displays examples in which the search syntax characters are used.

22. The user interface of claim 21 wherein the edit box accepts a first search syntax character and at least one search term input; and,
wherein the syntax help popup window displays an example in which the first search syntax character modifies the search term.

23. The user interface of claim 22 wherein the edit box accepts a first and second search term input; and,
wherein the syntax help popup window displays an example in which the first search term is linked to the second search term using the first search syntax character.

24. The user interface of claim 21
wherein the edit box accepts a plurality of search syntax character inputs; and,
wherein the syntax help popup window displays an example in which the plurality of search syntax characters that modify search terms.

* * * * *